United States Patent
Morrison et al.

(10) Patent No.: US 7,550,107 B2
(45) Date of Patent: Jun. 23, 2009

(54) METHOD OF FORMING CMC COMPONENT

(75) Inventors: Jay A. Morrison, Oviedo, FL (US); Jay E. Lane, Mims, FL (US)

(73) Assignee: Siemens Energy, Inc., Orlando, FL (US)

( * ) Notice: Subject to any disclaimer, the term of this patent is extended or adjusted under 35 U.S.C. 154(b) by 297 days.

(21) Appl. No.: 10/549,024

(22) PCT Filed: Jul. 25, 2005

(86) PCT No.: PCT/US2005/026339

§ 371 (c)(1), (2), (4) Date: Sep. 15, 2005

(87) PCT Pub. No.: WO2007/061398

PCT Pub. Date: May 31, 2007

(65) Prior Publication Data

US 2008/0116614 A1 May 22, 2008

(51) Int. Cl.
  *B28B 1/29* (2006.01)
(52) U.S. Cl. .................. 264/642; 264/640; 264/641
(58) Field of Classification Search ............. 264/604, 264/641, 642
  See application file for complete search history.

(56) References Cited

U.S. PATENT DOCUMENTS

| | | | |
|---|---|---|---|
| 4,029,254 A | 6/1977 | Blair et al. | |
| 4,089,456 A | 5/1978 | Toppen et al. | |
| 4,429,824 A | 2/1984 | Woodward | |
| 5,407,734 A | 4/1995 | Singh et al. | |
| 6,048,432 A | 4/2000 | Ecer | |
| 6,197,424 B1 | 3/2001 | Morrison et al. | |
| 6,696,144 B2 | 2/2004 | Holowczak et al. | |
| 6,838,162 B1 | 1/2005 | Gruber et al. | |
| 2002/0168505 A1 | 11/2002 | Morrison et al. | |
| 2002/0197465 A1* | 12/2002 | Butner et al. | ............ 428/293.4 |
| 2003/0232221 A1 | 12/2003 | Yamada et al. | |
| 2004/0058154 A1 | 3/2004 | Lau et al. | |

FOREIGN PATENT DOCUMENTS

WO    WO 02/085618 A1    10/2002

OTHER PUBLICATIONS

T. Radsick, B. Saruhan, H. Schneider, Damage Tolerant Oxide/Oxide Fiber Laminate Composites, Journal of the European Ceramic Society, May 2000, pp. 545-550, vol. 20, No. 5, XP004193032, ISSN 0955-2219, Elsevier Science Publishers, Barking, Essex, GB.

* cited by examiner

*Primary Examiner*—Steven P Griffin
*Assistant Examiner*—Russell J Kemmerle, III

(57) ABSTRACT

A method of forming a ceramic matrix composite (CMC) article (30) or a composite article (60) that minimizes the risk of delaminations while simultaneously maintaining a desired degree of porosity in the material. A pressure P applied against a surface of the article during a sintering process is controlled to be high enough to resist a separation force between the plies (66) of the CMC material (62) caused by anisotropic shrinkage of the material and/or to resist a separation force caused by differential shrinkage between the CMC material and an adjoined monolithic ceramic material (64). The pressure is also controlled to be low enough to avoid undue consolidation of the materials and to provide a desired degree of porosity in the sintered article. The pressure may be applied by delta-alpha tooling, and it may be varied verses the time of the sintering heating and/or across the article surface.

17 Claims, 2 Drawing Sheets

METHOD OF FORMING CMC COMPONENT

FIELD OF THE INVENTION

This application relates generally to the field of ceramic materials, and more generally to the field of ceramic matrix composite materials.

BACKGROUND OF THE INVENTION

Ceramic matrix composite (CMC) materials are known for use in high temperature environments such as along the hot combustion gas flow path of a gas turbine engine. CMC materials include ceramic reinforcing fibers disposed in a ceramic matrix material. FIG. 1 provides a partial cross-sectional view of a prior art article 10 formed of a plurality of plies 12, 14, 16 of a ceramic matrix composite material. Each of the plies 12, 14, 16 contains a 2-D weave of reinforcing fibers 18 encased within a matrix material 20. While the design of such an article assumes an intimate contact sintered bond between adjacent plies 12, 14, 16, what are seen in FIG. 1 are delaminations 22, 24 formed between adjacent plies in a non-planar region of the article 10. These delaminations 22, 24 are the result of the anisotropic shrinkage of the CMC material that occurs during the processing of the article 10. Anisotropic shrinkage results from the shrinkage of the matrix material 20 being greater than the shrinkage of the fibers 18 during the drying/curing/sintering of the material. Thus, a ply of the CMC material will tend to shrink more in its thru-thickness direction than in the in-plane direction of the fibers, tending to form delamination between adjacent plies. This is especially true in a non-planar region 26 where such anisotropic shrinkage drives a degree of relative movement between adjoining plies. When the in-plane adhesion between the plies in the planar regions 28 is stronger than the interlaminar adhesion between the plies in the non-planar region 26, at least a portion of the relative movement between adjoining plies may be accommodated by the generation of the delaminations 22, 24.

Known methods of manufacturing ceramic articles include hot pressing and hot isostatic pressing (HIP). These methods are capable of producing the very high pressures required to achieve fully dense (approaching zero porosity) ceramic materials. The present inventors are aware of such hot pressing processes being used at pressures ranging from as low as 750 psig to well above 10,000 psig. These methods are not used when manufacturing known oxide-oxide ceramic matrix composite materials, since a relatively high degree of porosity (10-30%) is generally required to provide a desired degree of fracture toughness in the fully sintered material. Accordingly, prior art multi-layer oxide-oxide CMC's, such as those including 2D alumino-silicate fibers within an alumina, alumina/mullite or mullite matrix, are generally sintered in an unsupported condition after being dried to a green state. In one example, a plurality of plies of CMC material containing alumino-silicate fibers in an alumina-containing matrix may be laid up against a mold using a vacuum bagging process, then dried to a green state in an autoclave at approximately 80 psig, then sintered in a furnace in an unsupported configuration. It is during the sintering step that delaminations 22, 24 often occur between the plies 12, 14, 16, with complex-shaped articles 10 including non-planar regions 26 being the most susceptible to the formation of such delaminations 22, 24. Even when significantly large delaminations are not formed, the resulting structure will exhibit significantly lower interlaminar strength than in-plane strength, with values for the example prior art materials typically being 4 MPa minimum (6 MPa average) interlaminar tensile strength and 140 MPa minimum in-plane strength. Higher strength materials are needed for certain applications and materials without delaminations are desired for all applications.

BRIEF DESCRIPTION OF THE DRAWINGS

The invention is explained in following description in view of the drawings that show.

DETAILED DESCRIPTION OF THE INVENTION

The present inventors have developed inventions including a novel method of accommodating the anisotropic shrinkage of a multilayer ceramic matrix composite material in order to minimize the occurrence of delamination defects without unduly densifying the material during the sintering process. The inventors have discovered that anisotropic shrinkage in these materials can be accommodated by generating creep within the fiber material, which in turn can be achieved at relatively low stress levels at the sintering temperatures necessary to produce the anisotropic shrinkage. This is achieved by controlling a pressure exerted against the material during the sintering process to within a range of pressures that is high enough to create a force to oppose a separation force tending to cause delamination and is simultaneously low enough to avoid undue densification and to maintain a desired level of porosity within the material.

Figure 1:
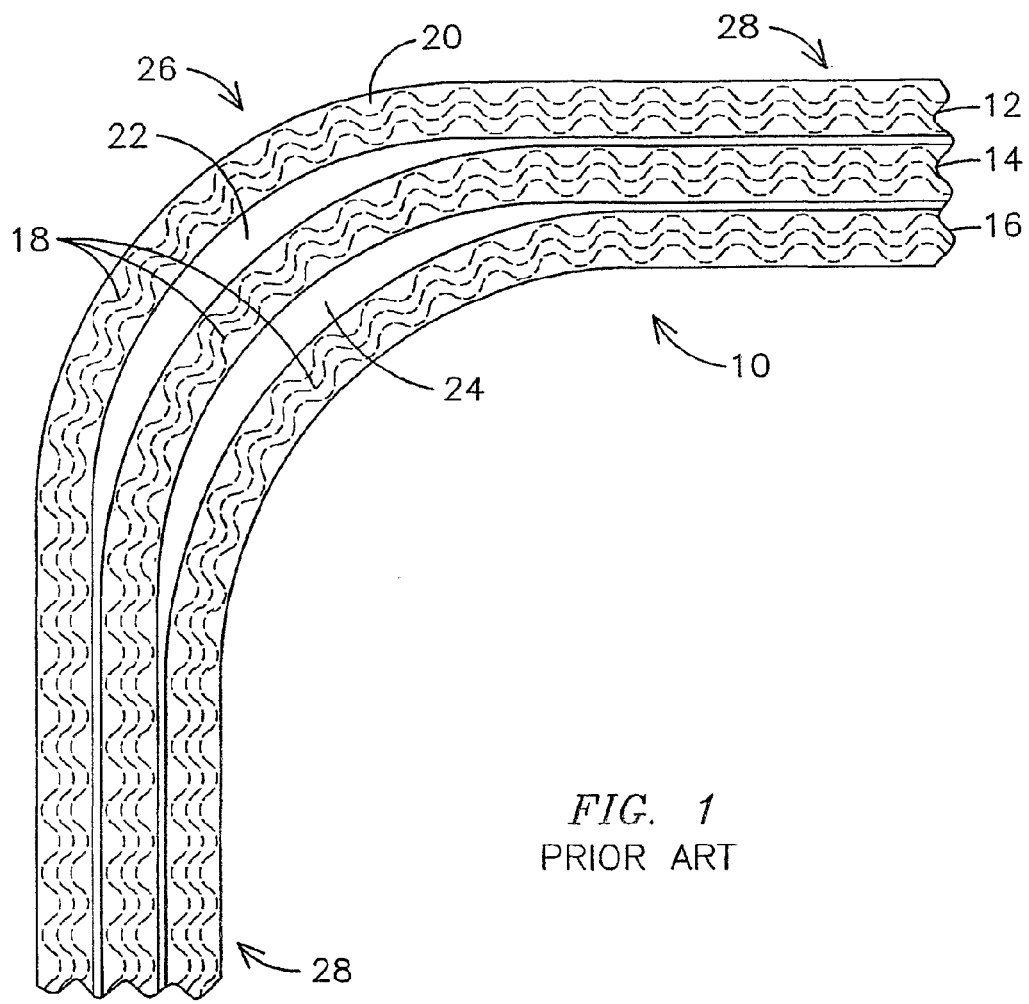
FIG. 1 is a partial cross-sectional view of a prior art multi-ply CMC article illustrating delaminations in a non-planar region.
Figure 2:
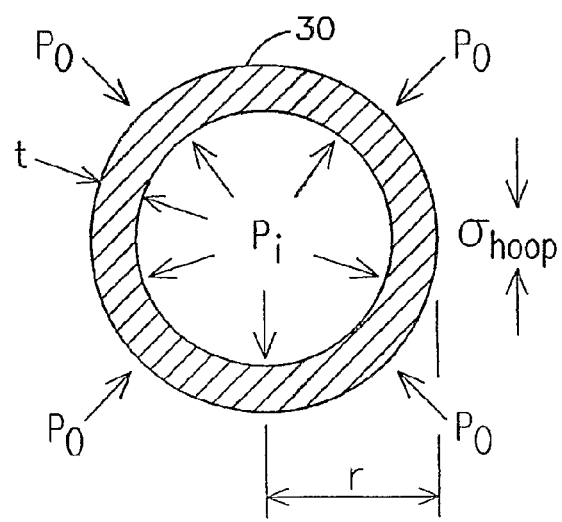
FIG. 2 is a cross-sectional view of a CMC cylinder undergoing a sintering process.

FIG. 2 illustrates a ceramic matrix composite article undergoing a sintering step. The article in this case is a cylinder 30, illustrated in a cross-sectional view. The cylinder 30 is formed of a plurality of circumferentially oriented plies (not illustrated) of oxide-oxide CMC material. The fibers of such a material may be formed of $Al_2O_3$, $Al_2O_3$—$SiO_2$, mullite, YAG or $Al_2O_3$—YAG eutectics, for example. Such materials are available from the Minnesota Mining and Manufacturing Company under the trademark NEXTEL, including NEXTEL 720 (alumino-silicate), NEXTEL 610 (alumina) and NEXTEL 650 (alumina and zirconia). The fibers may be in the form of a 2D fabric, a fiber tape, a 3D preform or filament. The fibers may be wrapped in a dry state or pre-impregnated with a matrix precursor such as alumina, mullite, or alumino-silicate, for example. As an example for the purpose of the following discussion, the cylinder 30 is assumed to be formed of alumino-silicate fibers in an alumina matrix.

After being dried and cured to a green state, cylinder 30 is heated to a sintering temperature to fully develop its material properties. The term sintering temperature is used herein to include a range of temperatures high enough to promote solid-state diffusion and densification within the material, thereby producing an intimate chemical bond between adjoining solid surfaces, but also low enough to avoid any undesired melting of the material. It is known that the example material will exhibit a difference between in-plane and thru-thickness shrinkage of about 5% when sintered at about 1,300° C. for four hours. The inventors have realized that this 5% anisotropic shrinkage can be accommodated without delaminations by inducing a 2.5% creep in both the radially inner and radially outer fibers. A 2.5% creep in four hours converts to a creep rate of $1.7 \times 10^{-6}$/second. It is also known that a stress level of about 2 MPa is necessary in order to achieve this creep rate in alumino-silicate fibers at 1,300° C. By applying an isostatic pressure P (illustrated in FIG. 2 as $P_i = P_o$) across the thickness of the cylinder wall, a hoop stress $\alpha_{hoop} = P(r/t)$ is generated within the fibers. For a cylinder 30 having a wall thickness t of 3 mm and a radius r of 12 mm, the applied pressure $P = P_i = P_o$ necessary to generate the desired creep rate of $1.7 \times 10^{-6}$/second is about 72 psig. Thus, the present inventors have realized that a relatively low pressure will ensure continuous contact between adjacent plies of the CMC material as the cylinder 30 sinters and undergoes anisotropic shrinkage, and importantly, that this pressure is low enough to produce a desired amount of porosity in the sintered material. Sintering at a very high level of pressure, such as greater than 750 psig for example, will cause consolidation of the material such as is desired for fully dense material applications. Sintering without restraint does produce a desired high level of microscopic porosity, but has also been known to result in large delamination flaws and/or cracks and/or large voids. A similar phenomenon occurs in more planar geometries where unrestrained sintering allows potential formation of large voids, thus creating a less than optimal distribution of void sizes. A sintering process utilizing a controlled low level of pressure, such as below 750 psig for example, may prevent the formation of large voids and thus be capable of providing a desired degree of microscopic porosity with a favorable distribution of small void sizes.

It is therefore possible for the first time to provide a fully fired multilayer oxide-oxide CMC product containing a desired significant amount of porosity, such as in the range of 10-30%, with reduced or no risk of delaminations. Furthermore, preliminary testing of this concept indicates that increased interface bonding and increased constituent sintering will occur as a result of simply restraining the adjoining surfaces from separation, resulting in an improved interlaminar tensile strength without any loss of in-plane tensile strength. If the example material described above were to be sintered without restraint in a planar configuration, as in the prior art method, it would exhibit an average interlaminar tensile strength of 6 MPa (4 MPa considered a minimum acceptable value) and an average in-plane tensile strength of 140 MPa. The same material processed with a low level of thru-thickness pressure applied to resist the interlaminar separation force resulting from anisotropic shrinkage without causing undue consolidation, in accordance with one embodiment of the present invention, may exhibit an average interlaminar tensile strength of at least 7 MPa while maintaining the average in-plane tensile strength of at least 140 MPa. If the same material were to be sintered without restraint in a cylindrical (FIG. 2) or L-shape (FIG. 3), the interlaminar tensile strength in the radii would be considerably less. Application of low-level thru-thickness pressure to resist the interlaminar separation force in these configurations can achieve strengths similar to the planar geometries.

In an embodiment of the present inventions, the thru-thickness pressure applied to the CMC article may be constant or varied during the heating of the article. For example, the pressure may be varied as a function of the time-dependent rate of anisotropic shrinkage. A CMC material heated to a sintering temperature may not exhibit a similar rate and/or magnitude of shrinkage in the in-plane and thru-thickness directions. Accordingly, the creep rate necessary to accommodate the anisotropic shrinkage may change over time as the material sinters. In one embodiment, the pressure applied to the article may change from a first value during a first period of sintering to a second value during a second period of sintering. In one embodiment, higher pressure is applied initially to prevent initiation of ply separation during the early stages of sintering; then as sintering progresses the pressure may be reduced as resisting forces also dissipate. Discrete or ramped pressure settings may be used. Pressure may be controlled in accordance with a predetermined program or as a function of a measured variable responsive to the actual shrinkage. Optimum pressure profiles are unique for each set of geometric constraints and must be determined largely by empirical methods.

Embodiments of the inventions include methods of manufacturing a ceramic matrix composite article. Such steps may include: forming a ceramic matrix composite article, such as a cylinder 30 or a gas turbine airfoil or ring segment for example, by stacking a plurality of plies of oxide-oxide ceramic matrix composite material, the surfaces of adjacent plies making contact to define a combined thru-thickness dimension; heating the body to a sintering temperature while applying a thru-thickness pressure against the body; controlling the pressure during the heating to a level sufficiently high to oppose a separation force developed between adjacent plies by anisotropic shrinkage of the plies in order to maintain contact between respective contacting surfaces; and controlling the pressure during the heating to a level sufficiently low to maintain a desired level of porosity within the body. The pressure may be controlled during the heating to a value that will generate a thru-thickness force at least equal to the separation force but no more than 10 times the separation force, or in the range of 3-7 times the separation force, or in another pressure range that provides the desired result. The pressure applied during the heating may be controlled to a level sufficiently low to maintain porosity within a range of 10-30%, or within a range of 15-25%, or other desired range that excludes a fully densified material. The pressure in some embodiments may be controlled during the heating to within a range of greater than 50 psig to less than 750 psig, or to within a range of greater than 100 psig to less than 500 psig, or to within a range of greater than 200 psig to less than 500 psig, or other range providing the desired result.

Figure 3:
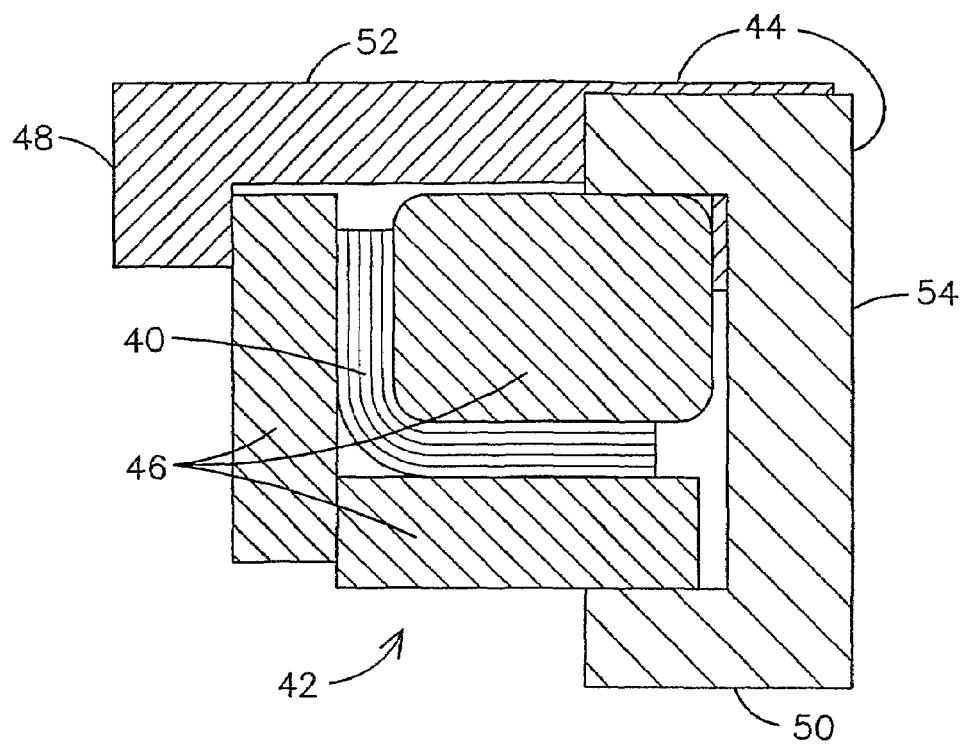
FIG. 3 is an end view of a CMC article undergoing a sintering process while constrained by delta-alpha multiplier tooling.

FIG. 3 illustrates another embodiment wherein a controlled amount of pressure is applied to a CMC article 40 during a sintering step by the use of delta-alpha multiplier tooling 42. The term delta-alpha multiplier is used herein to describe tooling that incorporates two or more members having different coefficients of thermal expansion in order to provide a controlled amount of pressure/force against a surface of an article upon heating of the article. The article 40 in the example illustrated in FIG. 3 is an L-shaped body having plies of CMC material laid up along the legs of the L-shape and extending around the non-planar elbow of the L-shape. Article 40 may be formed of a material A having a coefficient of thermal expansion $\alpha_A$. The article 40 has a thru-thickness dimension t. The article 40 is positioned at least partially within portions of a first tooling member 44 exhibiting a first coefficient of thermal expansion, and a second tooling member 46 exhibiting a second coefficient of thermal expansion higher than the first coefficient of thermal expansion is disposed between the first tooling member 44 and the article 40. Snug contact is maintained between all of the adjoining surfaces at room temperature when the article 40 is tooled. Coincident heating of the article 40, the first tooling member and the second tooling member over a temperature rise of ΔT will cause relatively greater expansion of the second tooling member 46 compared to the expansion of the first tooling member 44, thereby exerting a desired thru-thickness pressure against the article 40. Because the L-shaped article 40 illustrated in FIG. 3 has legs extending in two perpendicular directions, the first tooling member 44 is designed to have two hook portions 48, 50 shaped to present surfaces for capturing respective portions of the second tooling member 46. Optionally, a first portion 52 of the first tooling member 44 may be formed of a material Y exhibiting a coefficient of thermal expansion $\alpha_y$, and a second portion 54 of the first tooling member 44 may be formed of a material X exhibiting a second coefficient of thermal expansion $\alpha_x$ different than $\alpha_y$. The sintering shrinkage change $\Delta_t$ in the thru-thickness dimension t of the article 40 is accommodated by the differential changes in the respective dimensions of the tooling members that occur as the assembly is heated over the temperature range $\Delta T$ to a sintering temperature. This relationship may be expressed as:

$$\Delta_t = [L_1 \cdot \alpha_y - (t \cdot \alpha_A + h_1 \cdot \alpha_X + w_1 \cdot \alpha_X)] \cdot \Delta T \qquad (1)$$

Thus, any separation force developed between the plies of the CMC material A of article 40 due to anisotropic shrinkage may be resisted, while at the same time maintaining the pressure applied against the article 40 to a value low enough to prevent undue consolidation of the CMC material, by proper selection of the materials X, Y, Z of the various portions of delta-alpha tooling 42. Such fixed displacement methods apply an initially high pressure that subsequently relaxes due to sintering shrinkage and/or creep relaxation.

Figure 4:
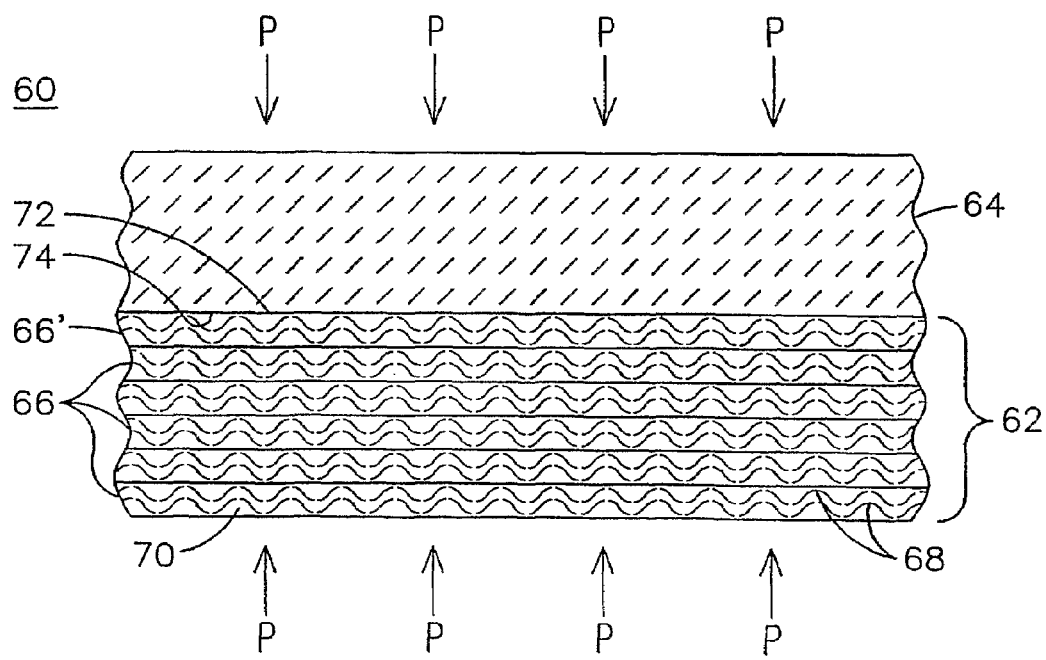
FIG. 4 is a partial cross-sectional view of an insulated CMC material undergoing a sintering process.

FIG. 4 is a partial cross-sectional view of a composite article 60 wherein a layer of a CMC material 62 is adjoined to a layer of a monolithic ceramic material 64. One example of such a material is described in U.S. Pat. No. 6,197,424 issued on Mar. 6, 2001, and assigned to the assignee of the present invention. The CMC material 62 includes a plurality of plies 66, each ply 66 containing reinforcing fibers 68 disposed in a matrix material 70. A top ply 66' has a top surface 72 adjoined to a bottom surface 74 of the monolithic material 64. A pressure P is applied to urge the adjoined surfaces 72, 74 together while heating the composite article 60 to a sintering temperature to bond the ceramic matrix composite material 62 to the monolithic ceramic material 64. The pressure P is applied to a level sufficiently high to overcome a separation force tending to separate the adjoining surfaces 72, 74 resulting from differential shrinkage between the ceramic matrix composite material 62 and the monolithic ceramic material 64. This pressure also overcomes any separation force existing between the plies 66 of the CMC material 62 that may result from the non-linear component of the weave of the fibers 68. The pressure may be limited to a level sufficiently low to maintain a desired level of porosity within the ceramic matrix composite material 62 and/or within the monolithic ceramic material 64. The pressure P may be a uniform pressure for a planar article. Alternatively, the pressure P may be varied along a surface of the article, particularly when the article contains a non-planar section where a higher level of pressure may be needed to overcome the separation forces generated in the non-planar region by anisotropic shrinkage of the CMC material 62 and by differential shrinkage between the CMC material 62 and the monolithic material 64. It is recognized that the degree of porosity that is obtained may vary across the article in accordance with such varying pressure and that in general the degree of porosity will be reduced as the pressure is increased. A combination of a varying the pressure along a surface of the article and varying the pressure at a particular point on the surface over time may be useful for more closely controlling the resulting porosity to a desired value.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method of manufacturing a ceramic matrix composite article, the method comprising:
    forming a ceramic matrix composite article by stacking a plurality of plies of oxide-oxide ceramic matrix composite material, surfaces of adjacent plies making contact to define a combined thru-thickness dimension;
    heating the article to a sintering temperature while applying a thru-thickness pressure against the article;
    controlling the pressure during the heating to a level sufficiently high to oppose a separation force developed between adjacent plies by anisotropic shrinkage of the plies in order to maintain contact between respective contacting surfaces; and
    controlling the pressure during the heating to a level sufficiently low within a range of greater than 50 psig to less than 750 psig to maintain a desired level of porosity within the article.

2. The method of claim 1, further comprising controlling the pressure during the heating to a value generating a thru-thickness force at least equal to the separation force and no more than 10 times the separation force.

3. The method of claim 1, further comprising controlling the pressure to a value generating a thru-thickness force in the range of 3-7 times the separation force.

4. The method of claim 1, further comprising controlling the pressure during the heating to a level sufficiently low to maintain porosity within a range of 10-30%.

5. The method of claim 1, further comprising controlling the pressure during the heating to a level sufficiently low to maintain porosity within a range of 15-25%.

6. The method of claim 1, further comprising controlling the pressure during the heating to within a range of greater than 50 psig to less than 750 psig.

7. The method of claim 1, further comprising controlling the pressure during the heating to within a range of greater than 100 psig to less than 500 psig.

8. The method of claim 1, further comprising controlling the pressure during the heating to within a range of greater than 200 psig to less than 500 psig.

9. The method of claim 1, further comprising:
    forming the plies of alumino-silicate fibers in an alumina-containing matrix; and
    controlling the pressure during the heating to a range of values that is effective to produce a sintered ceramic matrix composite article exhibiting interlaminar tensile strength of greater than 7 MPa while maintaining in-plane tensile strength of at least 140 MPa.

10. The method of claim 1, further comprising applying the pressure by:
    positioning the article at least partially within portions of a first tooling member exhibiting a first coefficient of thermal expansion;
    disposing a second tooling member exhibiting a second coefficient of thermal expansion higher than the first coefficient of thermal expansion between the first tooling member and the article; and
    heating the article, the first tooling member and the second tooling member together to cause relatively greater expansion of the second tooling member compared to expansion of the first tooling member, thereby exerting the thru-thickness pressure against the article.

11. The method of claim 1, further comprising varying the pressure verses time during the heating.

12. The method of claim 1, further comprising varying the pressure across a surface of the article.

13. A method of manufacturing a composite article, the method comprising:
- adjoining a surface of a ceramic matrix composite material to a surface of a monolithic ceramic material to form a composite article;
- applying pressure to urge the adjoined surfaces together while heating the composite article to a sintering temperature to bond the ceramic matrix composite material to the monolithic ceramic material along the adjoined surfaces;
- applying the pressure to a level sufficiently high to overcome a separation force tending to separate the adjoining surfaces resulting from differential shrinkage between the ceramic matrix composite material and the monolithic ceramic material;
- limiting the pressure to a level sufficiently low to maintain a desired level of porosity within at least one of the ceramic matrix composite material and the monolithic ceramic material; and
- controlling the pressure to be responsive to actual shrinkage of the composite article.

14. The method of claim 13, further comprising controlling the pressure during the heating to a value generating a force at least equal to the separation force and no more than 10 times the separation force.

15. The method of claim 13, further comprising controlling the pressure during the heating to a level sufficiently low to maintain porosity within the at least one of the ceramic matrix composite material and the monolithic ceramic material to within a range of 10-30%.

16. The method of claim 13, further comprising controlling the pressure during the heating to within a range of greater than 50 psig to less than 750 psig.

17. The method of claim 13, wherein the ceramic matrix composite material comprises multiple plies of reinforcing fabric disposed in matrix material, and wherein the adjoined surfaces comprise a non-planar region, and further comprising:
- applying the pressure to a level sufficiently high to overcome a first separation force tending to separate the adjoining surfaces and to overcome a second separation force tending to separate adjoining plies of the ceramic matrix composite material and effective to prevent delamination in the non-planar region; and
- limiting the pressure to a level sufficiently low to maintain a desired level of porosity within the ceramic matrix composite material of at least 10%.

* * * * *